United States Patent Office 3,278,466
Patented Oct. 11, 1966

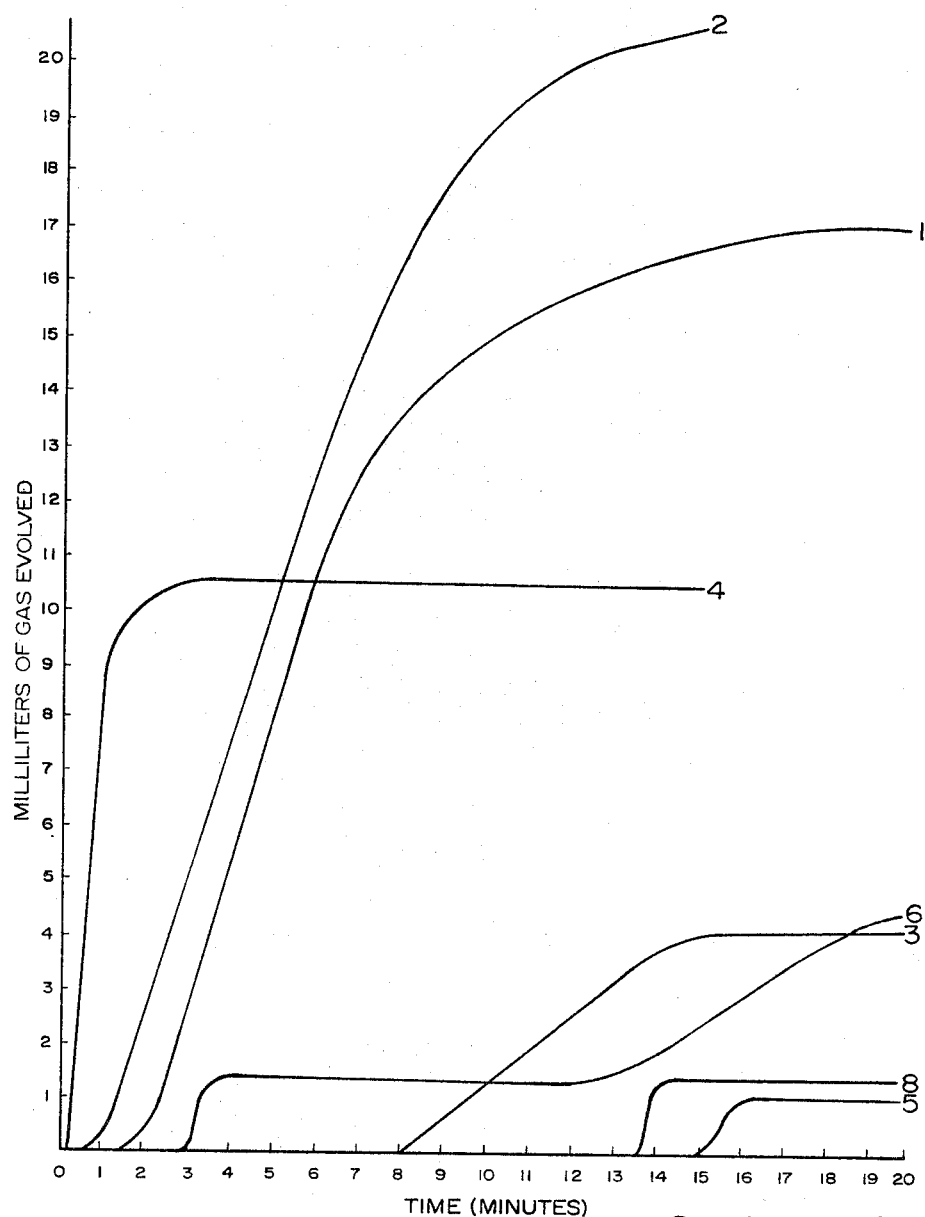

3,278,466
THERMOPLASTIC CELLULAR POLYMERS WITH MIXED BLOWING AGENTS
Donald John Cram, 98 Parklands Drive, Loughborough, England, and Ronald Arthur Reed, 71 Chaveney Road, Quorn, England
Filed Feb. 23, 1965, Ser. No. 439,503
Claims priority, application Great Britain, Oct. 21, 1961, 37,823/61; Mar. 14, 1962, 9,736/62; July 12, 1962, 26,775/62
16 Claims. (Cl. 260—2.5)

This application is a continuation-in-part of application Serial No. 230,427, filed October 15, 1962, and now abandoned.

The present invention relates to blowing agent compositions having relatively low decomposition temperatures.

The blowing agents with which this specification is concerned are organic chemical compounds which decompose on heating to evolve gaseous products containing elemental nitrogen. By formulating suitable compositions comprising thermoplastic resins or polymers and blowing agents, and processing them it is possible to obtain cellular products having a wide range of densities, hardness, etc.

To be effective it is necessary for the blowing agent to decompose at a temperature at which the particular resin or polymer or composition thereof being blown is adequately plastic. Therefore in order to adapt a blowing agent for use with a given resin or polymer or composition thereof it is useful to be able to lower the decomposition temperature of the blowing agent. It has now surprisingly been found that some organic blowing agents when mixed in small proportions with azodicarbonamide serve to lower its decomposition temperature.

It has been proposed to use a wide variety of apparently unconnected compounds to lower the decomposition temperature of blowing agents, these compounds being commonly known as kickers. Typical kickers are borax, urea, lead salts, zinc oxide and the like. Some of the substances referred to as kickers, namely urea and biuret, have also been used as blowing agents, but their use as blowing agents has not achieved commercial acceptance and they differ markedly from the organic blowing agents which are used according to the present invention to lower the decomposition temperature of azodicarbonamide in that they do not decompose readily at a precise temperature and their decomposition products include ammonia which of course, has an undesirable odor. Additionally it has been proposed to use a mixture of two blowing agents as an alternative to using a single blowing agent. This use does not involve any interaction between the blowing agents and the combination behaves as the sum of the parts. It has also been proposed to use biurea in small proportions to lower the decomposition temperature of azodicarbonamide. Biurea is not, however, a blowing agent and anyway the effect was in reality due to the small size to which the components had to be ground in order to obtain satisfactory mixing. Thus, while there have been previous disclosures of kickers for blowing agents and of mixtures of blowing agents, it has never before been recognised that certain blowing agents of themselves could act as kickers for a particular blowing agent namely azodicarbonamide. Using a blowing agent as a kicker is superior to the conventional kicker in that more efficient decomposition of the azodicarbonamide is obtained, there is no deleterious effect on the resin and they do not stain in contact with hydrogen sulphide. There is in effect interaction between the azodicarbonamide and the secondary blowing agent whereby the decomposition of the azodicarbonamide is facilitated and improved.

Accordingly the present invention comprises a composition for use in the production of cellular polymeric materials, said composition comprising azodicarbonamide as a primary blowing agent and at least one secondary blowing agent, said secondary blowing agent being characterised in (1) having a lower decomposition temperature than azodicarbonamide, (2) having a molecular structure in which at least one nitrogen atom is linked directly to an adjacent nitrogen atom and (3) in decomposing to give a gaseous product containing elemental nitrogen.

Preferably the secondary blowing agent is selected from the group consisting of sulphonhydrazides, aliphatic azo compounds, carbohydrazides and N-nitroso compounds. Suitable sulphonhydrazides are benzene sulphonhydrazide, toluene sulphonhydrazide, p,p'-oxy-bis(benzene sulphonhydrazide), p,p'-methylene-bis(benzene sulphonhydrazide), p,p'-thio-bis(benzene sulphonhydrazide) and tetramethylene bis-sulphonhydrazide. Suitable aliphatic azo compounds are azoisobutyric amide-oxime, azoisobutyric dinitrile, azo-dicyclohexylnitrile, azoisobutyric acid and ethyl azoisobutyrate. Suitable N-nitroso compounds are dinitrosopentamethylene-tetramine, NN'-dinitrosopiperazine, NN' - dimethyl-NN'-dinitrosoterephthalamide and NN'-dimethyl-NN'-dinitroso-succinamide.

Preferably the present invention comprises a composition containing a major proportion of azodicarbonamide and a minor proportion of at least one secondary blowing agent as hereinbefore defined.

It is thought that the exothermic heat of decomposition of the secondary blowing agent brings about the decomposition of the azodicarbonamide at a temperature below that at which it would normally decompose and it is preferred to use as secondary blowing agent one having a high exotherm. Naturally the gases formed by the decomposition of the secondary blowing agent also assist in the expansion of the thermoplastic resinous or polymeric material.

Possible compositions according to the present invention include (a) azodicarbonamide and benzene sulphonhydrazide as secondary blowing agent; (b) azodicarbonamide and azoisobutyric amide-oxime as secondary blowing agent; (c) azodicarbonamide and azoisobutyric amide-oxime and benzene sulphonhydrazide as secondary blowing agents; (d) azodicarbonamide and p-toluene sulphonhydrazide as secondary blowing agent and other combinations.

According to one embodiment of the present invention there is provided a composition which comprises a major amount of azodicarbonamide as a primary blowing agent and a minor amount of a secondary blowing agent selected from the group consisting of benzene sulphonhydrazide, p-toluene sulphonhydrazide, azoisobutyric amide-oxime, dinitrosopenta-methylene-tetramine, azoisobutyric dinitrile, p,p'-oxy-bis(benzene sulphonhydrazide), azo-dicyclohexylnitrile and mixtures of these.

According to a preferred embodiment of the present invention there is provided a composition which comprises a major amount of azodicarbonamide as a primary blowing agent and a minor amount of a secondary blowing agent selected from the group consisting of benzene-sulphonhydrazide, p-toluene sulphonhydrazide, azoisobutyric amide-oxime, dinitrosopentamethylene tetramine or mixtures of these.

Suitably the secondary blowing agent comprises 5–60% by weight of the weight of the azodicarbonamide. Preferably the secondary blowing agent comprises 10–50% by weight of the weight of the azodicarbonamide.

The blowing agent composition of the present invention is used in the preparation of cellular products from resins or polymers which are thermoplastic and can be milled. Such materials include natural and synthetic rubbers. Synthetic rubbers include copolymers of butadiene and acrylonitrile, copolymers of butadiene and styrene and polymers of 2-chloro-1,3-butadiene. Other polymers which may be used include vinyl polymers such as polyvinyl chloride, polyvinyl acetate and polyvinylidene chloride; vinyl copolymers such as copolymers of vinyl chloride and vinyl acetate and copolymers of vinylidene chloride and acrylonitrile; alkylene polymers such as polyethylene and polypropylene; and polyamides. The present invention is also for compositions comprising azodicarbonamide, a secondary blowing agent and a resin or polymer as defined above.

The proportion of blowing agent employed in compositions of the present invention which contain resinous or polymeric material may vary over a wide range depending on the extent of expansion of the product which it is desired to obtain. In general the amount of blowing agent used will comprise about ½ to 25% by weight of the resin or polymer. The proportions most usually employed fall within the range 1–15% by weight of the resin or polymer.

Compositions of the present invention which contain those resins or polymers which may be plasticised such as polyvinyl and polyamide materials may further comprise plasticisers, the plasticiser being selected with a view to obtaining a suitably fluid composition for blowing and with a view to obtaining a product of appropriate hardness. Suitable plasticisers include dioctyl phthalate, butyl nonyl phthalate, butyl benzyl phthalate, dioctyl sebacate, tricresyl phosphate, trixylenyl phosphate, dodecyl adipate, and triethylene glycol dipelargonate. The composition may additionally contain secondary plasticisers. Compositions of the present invention which contain rubber may also comprise an oil.

Furthermore the composition of the present invention may include one or more of the other normal components used in rubber or polymer technology such as for example fillers, wetting agents, stabilisers, antioxidants, dyes, pigments, lubricants etc. Suitable fillers include whiting, silicates such as mica, silica, carbon black etc. Suitable wetting agents include anionic and non-ionic wetting agents. Suitable stabilisers include lead, barium, calcium or cadmium salts. Lead salts may also be used as kickers, but give rise to sulphide stains when the product is exposed to an atmosphere containing hydrogen sulphide.

The compositions of the present invention may be formed by mixing in any convenient way such as for example on a multiple-roll mill.

The present invention also provides a process for producing a cellular resinous or polymeric material which comprises forming a mixture comprising azodicarbonamide, preferably present in a major proportion, one or more secondary blowing agents, preferably present in a minor proportion, having a lower decomposition temperature than the azodicarbonamide, and a resinous or polymeric material, part filling a mould with the mixture, closing the mould, heating the mould to decompose the blowing agents and expand the resinous or polymeric material and removing the product from the mould. In this process the underloading of the mould is adjusted to ensure that the mixture fills the mould completely when it has expanded. The mixture may comprise any of the components commonly used in rubber or polymer technology.

Furthermore the present invention provides a process for producing a cellular resinous or polymeric material which comprises forming a mixture comprising azodicarbonamide, preferably present in a major proportion, one or more secondary blowing agents, preferably present in a minor proportion, having a lower decomposition temperature than the azodicarbonamide, and a resinous or polymeric material, fully filling a mould with the mixture, closing the mould and heating it under pressure to decompose the blowing agents, cooling the mould, removing the product and heating it to a temperature at which it becomes plastic and expands. The second stage heating may be carried out in any suitable way such as for instance in an oven or in the open in hot air, oil or steam.

In addition the present invention provides a process for producing a cellular resinous or polymeric material which comprises forming a mixture comprising azodicarbonamide, preferably present in a major proportion, one or more secondary blowing agents, preferably present in a minor proportion, having a lower decomposition temperature than the azodicarbonamide, and a resinous or polymeric material and heating the mixture to decompose the blowing agents and expand the resinous or polymeric material. The mixture may be spread on a metal plate, a release paper, a polyvinylchloride sheet or a fabric backing, and the heating accomplished statically or on a moving belt passing through an oven.

Suitably in the processes of the present invention the secondary blowing agent is selected from the group consisting of benzenesulphonhydrazide, azoisobutyric amide-oxime, p-toluene sulphonhydrazide dinitrosopentamethylene-tetramine, or a mixture of these. By using such combinations of blowing agent it is possible to lower the blowing temperature of the azodicarbonamide to such a degree that it is possible to use conventional factory steam heat for the decomposition. It has also been found that the azodicarbonamide is more completely decomposed in the presence of benzenesulphonhydrazide as is evidenced by the complete absence of any residual yellowish colour in expanded resinous or polymeric materials.

The following examples are given to illustrate the present invention:

*Example 1*

The following mixtures A and B were prepared:

| | A | B |
|---|---|---|
| PVC (paste forming grade) | 100 | 100 |
| Benzenesulphonhydrazide | | 1 |
| Azodicarbonamide | 4 | 4 |
| White lead paste in dibutylphthalate (7:1) | 4 | 4 |
| Butyl nonyl phthalate | 10 | 10 |
| Cereclor 42 (RTM) a chlorinated paraffin | 40 | 40 |
| Whiting | 100 | 100 |

The components of the mixture were thoroughly mixed on a three-roll mill. The resulting fluid mixture was spread on a suitable carrier, for example a length of fabric and the coated fabric was passed through an infra-red heated oven designed to give an ambient temperature of 160–170° C.

Under these conditions mix B expanded better than mix A and also gave a product having a lighter colour.

*Example 2*

Two mixtures were formulated as in Example 1 and were used to partially charge two arm-rest moulds. These moulds were heated between the platens of a hydraulic press at 170–175° C. After heating the moulds were cooled.

The first spew appeared on the mold containing mix A after 29 minutes heating. The product had medium cells, contained one large void and was yellow in colour. No spew appeared on the mould containing mix B after 29 minutes heating but the mould was fully filled; the product had a whiter colour and finer cells than the product obtained from mix A.

*Example 3*

The attached graph illustrates the amount of gas evolved in a given time for various formulations containing azodicarbonamide. In each case the azodicarbonamide was ground to pass a 160 BSS mesh sieve and suspended in a liquid. The liquid was placed in a Victor Mayer apparatus and heated, and the amount of gas evolved in a given time was noted.

Curve 1 illustrates the decomposition of 0.1 gram of azodicarbonamide when heated to 194° C. in tritolyl phosphate suspension. Curve 2 shows that 0.1 gram of a mixture containing 6 parts of azodicarbonamide and 1 part of benzenesulphonhydrazide when heated to 194° C. in tritolyl phosphate suspension evolves gas at a higher rate.

Curves 3 and 4 illustrate a similar experiment in which the suspending medium was liquid paraffin heated to 190° C. Curve 3 shows the decomposition of azodicarbonamide and curve 3 shows the decomposition of an azodicarbonamide/benzenesulphonhydrazide mix. It is apparent that a much greater volume of gas is evolved in a much shorter time when the azodicarbonamide contains a small proportion of benzenesulphonhydrazide.

The experiments illustrated by curves 1 and 2 were repeated at 185° C. and gave decomposition curves represented by curves 5 and 6. A further experiment was performed under the same conditions at 185° C. using 0.1 gram of a mix containing 6 parts of azodicarbonamide and 1 part of zinc oxide as a kicker. The decomposition curve of this formulation is represented by line 8. Of the three the formulation containing a small proportion of benzenesulphonhydrazide, as shown by curve 6, performed the most efficiently as a blowing agent.

*Example 4*

The following mixture was prepared:

| | Parts |
|---|---|
| PVC (paste forming grade) | 100 |
| Dutrex 3 (a petroleum derivative having a specific gravity of 0.973–0.983 and a flash point of 310° F.) | 60 |
| Di-octyl phthalate | 20 |
| White lead paste in dibutylphthalate (7:1) | 5 |
| Blowing agent | 14 |

The components of the mixture were thoroughly mixed on a three-roll mill. The resulting product was placed in a mould which was heated under pressure for ten minutes, cooled for a period of ten minutes and then removed from the mould and heated for a further fifteen minutes at 100° C. in water. The results using different blowing agent combinations are illustrated in the following table.

In this table the following abbreviations are used:

AO = Azoisobutyric amide-oxime
BSH = Benzene sulphonhydrazide
AC = Azodicarbonamide

| Experiment No. | Blowing agent | Temperature to which mould is heated, °C. | Final density, gms./cc. |
|---|---|---|---|
| 1 | AO/BSH/AC (1:1:6) | 140 | 0.5 |
| 2 | AO/BSH/AC (1:1:6) | 150 | 0.265 |
| 3 | AO/BSH/AC (1:1:6) | 160 | 0.2 |
| 4 | AO/BSH/AC (2:1:6) | 145 | 0.164 |
| 5 | AO/BSH/AC (2:1:6) | 150 | 0.16 |
| 6 | AO/BSH/AC (2:1:6) | 160 | 0.126 |

*Example 5*

Rubber mixes were formulated as follows:

| | 1 | 2 | 3 | 4 |
|---|---|---|---|---|
| Natural rubber, smoked sheet, Grade 1 | 50 | 50 | 50 | 50 |
| Polysar SS 250 (a butadiene-styrene copolymer containing approximately 54% styrene) | 50 | 50 | 50 | 50 |
| Zinc oxide | 5 | 5 | 5 | 5 |
| Diphenyl guanidine | 1.5 | 1.5 | 1.5 | 1.5 |
| Tetramethyl thiuramdisulphide | 0.5 | 0.5 | 0.5 | 0.5 |
| Nonox N5 (a phenol-aldehyde-amine condensate) | 1 | 1 | 1 | 1 |
| Titanium dioxide | 10 | 10 | 10 | 10 |
| Manosil VN3 (Silica) | 50 | 50 | 50 | 50 |
| Sulphur | 2.5 | 2.5 | 2.5 | 2.5 |
| Azodicarbonamide/dinitrosopentamethylenetetramine (6:1) | | 2 | 3 | 4 |
| Azodicarbonamide alone | 2 | | | |

Each mix was loaded into a mould 2 inches by 2 inches by half-inch and vulcanised for 12 minutes at 160° C. with mould loading about 103%. An "after-cure" was given of 30 minutes at 150–155° C. (After cure is carried out in an oven and is to both complete vulcanisation and to prevent shrinkage of expanded rubber when in use.) Each sample when removed from the mould was cut into two pieces and one-half only was given an "after-cure."

The following results were obtained:

(i) BEFORE "AFTER-CURE"

| Mix | 1 | 2 | 3 | 4 |
|---|---|---|---|---|
| Weight (g.) | 19.84 | 20.84 | 20.88 | 17.23 |
| Volume (mls.) | 28.0 | 36.7 | 36.7 | 54.2 |
| Density g./cc. | 0.707 | 0.567 | 0.570 | 0.318 |
| Hardness (B.S., degrees): | | | | |
| Skin | 90 | 80 | 80 | 65 |
| Cut surface | 60 | 48 | 47 | 40 |

(ii) AFTER "AFTER-CURE"

| Mix | 1 | 2 | 3 | 4 |
|---|---|---|---|---|
| Weight (g.) | 20.57 | 19.36 | 19.40 | 16.14 |
| Volume (mls.) | 36.1 | 42.4 | 42.0 | 51.5 |
| Density g./cc. | 0.571 | 0.458 | 0.462 | 0.313 |
| Hardness (B.S., degrees): | | | | |
| Skin | 84 | 73 | 76 | 56 |
| Cut surface | 60 | 44 | 44 | 35 |

It will be seen that the mixture of azodicarbonamide and dinitrosopentamethylene-tetramine gives a greater expansion than azodicarbonamide alone.

*Example 6*

Rubber mixes were formulated as follows:

| | 1 | 2 |
|---|---|---|
| Intol 1502 (Styrene butadiene copolymer approximately 23.5% sytrene) | 40 | 40 |
| Polysar SS 250 (a butadiene styrene copolymer containing approximately 54% styrene) | 60 | 60 |
| Hardwood resin | 10 | 10 |
| Zinc oxide | 5 | 5 |
| Stearic acid | 3 | 3 |
| Octamine (an antioxidant comprising the reaction product of diphenylamine and di-isobutylene) | 1 | 1 |
| Manosil VN3 (silica) | 30 | 30 |
| Stockalite (China clay) | 60 | 60 |
| Purified wood cellulose | 5 | 5 |
| Paraffin wax | 2 | 2 |
| B.P. extract light 1.5 (high aromatic hydrocarbon oil) | 20 | 20 |
| Diethylene glycol | 2 | 2 |
| Triethanolamine | 1 | 1 |
| Sulphur | 3 | 3 |
| Dibensthiazyl disulphide | 1.25 | 1.25 |
| Tetramethyl thiuram disulphide | 0.4 | 0.4 |
| Azodicarbonamide/dinitrosopentamethylene-tetramine (6:1) | 4 | |
| Azodicarbonamide | | 4 |

These mixes were processed as in Example 5 with the following results:

| Mix | Before "after-cure" | | After "after-cure" | |
|---|---|---|---|---|
| | 1 | 2 | 1 | 2 |
| Weight | 15.93 | 20.57 | 16.14 | 19.36 |
| Volume | 54.9 | 36.1 | 51.5 | 42.4 |
| Density | 0.290 | 0.571 | 0.313 | 0.458 |
| Hardness (B.S., degrees): | | | | |
| Skin | 51 | 84 | 56 | 73 |
| Cut surface | 32 | 60 | 35 | 44 |

It will be seen that the mixture of azodicarbonamide and dinitrosopentamethylene-tetramine gives a greater expansion than azodicarbonamide alone.

In the rubber mixes of Examples 5 and 6 it is probable that stearic acid or diphenyl guanidine acts as a kicker for the dinitrosopentamethylene-tetramine thus giving it a lower decomposition temperature than the azodicarbonamide.

*Example 7*

The following mixture was prepared:

| | Parts |
|---|---|
| Polyvinylchloride (paste forming grade) e.g. Breon 121 | 55 |
| Vinyl chloride: vinylidene chloride copolymer e.g. Breon 202 | 45 |
| Extender e.g. Dutrex 3 | 60 |
| Dioctyl phthalate | 20 |
| White lead posts in dibutyl phthalate (7:1) | 5 |
| Blowing agent | 14 |

The components of the mixture were thoroughly mixed on a three-roll mill. The resulting product was placed in a mould which was heated under pressure for ten minutes, cooled for a period of ten minutes and then removed from the mould and heated for a further fifteen minutes at 100° C. The results using an azodicarbonamide-p-toluene sulphonhydrazide mixture are illustrated in the accompanying table.

| Exp. No. | Azodicarbonamide/TSH ratio | Temperatures to which mould was heated, ° C. | Final density, lbs./cu. ft. |
|---|---|---|---|
| 1 | 6:1 | 165 | 9.3 |
| 2 | 6:1 | 160 | 11.5 |

We claim:
1. A composition for use in the production of thermoplastic, cellular polymeric materials, said composition comprising azodicarbonamide as a primary blowing agent and at least one secondary blowing agent, said secondary blowing agent being characterised in (1) having a lower decomposition temperature than azodicarbonamide, (2) having a molecular structure in which at least one nitrogen atom is linked directly to an adjacent nitrogen atom and (3) in decomposing to give a gaseous product containing elemental nitrogen.

2. A composition as claimed in claim 1 which contains a major proportion of the azodicarbonamide and a minor proportion of the secondary blowing agent.

3. A composition for use in the production of thermoplastic, cellular polymeric materials containing azodicarbonamide as a primary blowing agent and as a secondary blowing agent at least one member selected from the group consisting of benzene sulphonhydrazide, p-toluene sulphonhydrazide azoisobutyricamide-oxime, dinitrosopentamethylenetetramine, azoisobutyric dinitrile, pp'-oxy-bis(benzene sulphonhydrazide), azodicyclohexylnitrile, the weight of the secondary blowing agent being 5–60% by weight of the weight of the azodicarbonamide.

4. A process which comprises mixing finely ground azodicarbonamide with at least one finely ground secondary blowing agent selected from the group consisting of benzene sulphonhydrazide, p-toluene sulphonhydrazide, azoisobutyricamide-oxime, dinitrosopentamethylenetetramine, azoisobutyric nitrile, pp'-oxy-bis(benzene sulphonhydrazide), azodicyclohexylnitrile, the weight of the secondary blowing agent being 5–60% by weight of the weight of the azodicarbonamide.

5. A process for producing thermoplastic cellular polymeric material which comprises forming a mixture comprising (1) azodicarbonamide as a primary blowing agent (2) as a secondary blowing agent at least one member selected from the group consisting of benzene sulphonhydrazide p-toluene sulphonhydrazide azoisobutyricamideoxime, dinitrosopentamethylene tetramine, azoisobutyric nitrile, pp'-oxy-bis(benzene sulphonhydrazide), azo-dicyclohexylnitrile, the weight of the secondary blowing agent being 5–60% by weight of the weight of the azodicarbonamide, and (3) a thermoplastic polymeric material, part filling a mould with the mixture, closing the mould, heating the mould to decompose the blowing agent and expand the resinous or polymeric material and removing the product from the mould.

6. A process for producing thermoplastic, cellular polymeric material which comprises forming a mixture comprising (1) azodicarbonamide as a primary blowing agent (2) as a secondary blowing agent at least one member selected from the group consisting of benzene sulphonhydrazide, p-toluene sulphonhydrazide, azoisobutyricamideoxime, dinitrosopentamethylene-tetramine, azo-isobutyric nitrile, p,p'-oxy-bis(benzene sulphonhydrazide), azo-dicyclohexylnitrile, the weight of the secondary blowing agent being 5–60% by weight of the weight of the azodicarbonamide and (3) thermoplastic polymeric material, fully filling a mould with the mixture, closing the mould and heating it under pressure to decompose the blowing agents, cooling the mould, removing the product and heating it to a temperature at which it becomes plastic and expands.

7. A process for producing thermoplastic, cellular polymeric material which comprises forming a mixture comprising (1) azodicarbonamide, as a primary blowing agent (2) as a secondary blowing agent at least one member selected from the group consisting of benzene sulphonhydrazide, p-toluene sulphonhydrazide, azo-isoisobutyriicamideoxime, dinitrosopentamethylene-tetramine, azoisobutyric nitrile, pp'-oxy-bis(benzene sulphonhydrazide), azo dicyclohexylnitrile, the weight of the secondary blowing agent being 5–60% by weight of the weight of the azodicarbonamide, and (3) a thermoplastic polymeric material and heating the mixture to decompose the blowing agents and expand the polymeric material.

8. A process as claimed in claim 7 wherein the mixture is spread on a metal plate and the heating is accomplished statically.

9. A composition consisting essentially of (1) a polymeric material selected from the group consisting of natural rubber, polyamides, and a polymer derived from a member selected from the group consisting of vinyl chloride, styrene, butadiene, chlorobutadiene, propylene, acrylonitrile, and vinyl acetate; (2) azodicarbonamide as a primary blowing agent; and (3) at least one secondary blowing agent selected from the group consisting of benzene sulphonhydrazide, p-toluene sulphonhydrazide, azoisobutyricamide - oxime, dinitrosopentamethylene tetramine, azoisobutyric dinitrile, pp'-oxy-bis(benzene sulphonhydrazide), and azodicyclohexyl nitrile, the weight of the secondary blowing agent being from 10 to 50% by weight of the weight of the azodicarbonamide.

10. A process as claimed in claim 7 wherein the mixture is spread on a metal plate and the heating is accomplished by passing the spread mixture through an oven.

11. A process as claimed in claim 7 wherein the mixture is spread on a release paper and the heating is accomplished statically.

12. A process as claimed in claim 7 wherein the mixture is spread on a release paper and the heating is accomplished by passing the spread mixture through an oven.

13. A process as claimed in claim 7 wherein the mixture is spread on a sheet of plastic and the heating is accomplished statically.

14. A process as claimed in claim 7 wherein the mixture is spread on a sheet of plastic and the heating is accomplished by passing the spread mixture through an oven.

15. A process as claimed in claim 7 wherein the mixture is spread on a fabric backing and the heating is accomplished statically.

16. A process as claimed in claim 7 wherein the mixture is spread on a fabric backing and the heating is accomplished by passing the spread mixture through an oven.

References Cited by the Examiner

UNITED STATES PATENTS

| | | | |
|---|---|---|---|
| 2,668,152 | 2/1954 | O'Neal | 260—2.5 |
| 2,678,293 | 5/1954 | McMillan et al. | 260—2.5 |
| 2,707,707 | 5/1955 | Schwartz | 260—2.5 |
| 2,754,276 | 7/1956 | Walker et al. | 260—2.5 |
| 2,804,435 | 8/1957 | Reed | 260—2.5 |

FOREIGN PATENTS

| | | |
|---|---|---|
| 808,763 | 2/1959 | Great Britain. |
| 827,996 | 2/1960 | Great Britain. |
| 847,921 | 9/1960 | Great Britain. |

OTHER REFERENCES

"Plastics Progress—1955—" (papers and discussions at the British Plastics Convention, 1955), New York, Philosophical Library, "The Chemistry of Modern Blowing Agents" by R. A. Reed, pp. 51–79.

MURRAY TILLMAN, *Primary Examiner.*

M. F. OELAK, *Assistant Examiner.*